(12) United States Patent
Hsu-Hoffman et al.

(10) Patent No.: US 10,304,265 B1
(45) Date of Patent: May 28, 2019

(54) DRIVER PERFORMANCE RATINGS

(71) Applicant: Allstate Insurance Company, Northbrook, IL (US)

(72) Inventors: Chienlan Hsu-Hoffman, Palo Alto, CA (US); Maryam Zahedi, Portola Valley, CA (US); Taylor Parsell, Berkeley, CA (US); Evan Gibbs, Daly City, CA (US)

(73) Assignee: Arity International Limited, Belfast, Antrim (GB)

( * ) Notice: Subject to any disclaimer, the term of this patent is extended or adjusted under 35 U.S.C. 154(b) by 0 days.

(21) Appl. No.: 16/011,312

(22) Filed: Jun. 18, 2018

Related U.S. Application Data (63) Continuation of application No. 15/861,884, filed on Jan. 4, 2018, now Pat. No. 10,026,243, which is a continuation of application No. 14/883,186, filed on Oct. 14, 2015, now Pat. No. 9,892,573.

(51) Int. Cl.
| | |
|---|---|
| *G07C 5/08* | (2006.01) |
| *G07C 5/00* | (2006.01) |
| *G06Q 40/08* | (2012.01) |
| *G06Q 30/02* | (2012.01) |

(52) U.S. Cl.
CPC .......... *G07C 5/085* (2013.01); *G06Q 30/0279* (2013.01); *G06Q 40/08* (2013.01); *G07C 5/008* (2013.01); *G07C 5/0816* (2013.01)

(58) Field of Classification Search
CPC ...... G07C 5/085; G07C 5/008; G07C 5/0816; G06Q 40/08; G06Q 30/0279
See application file for complete search history.

(56) References Cited

U.S. PATENT DOCUMENTS

| | | |
|---|---|---|
| 5,002,283 A | 3/1991 | Langham et al. |
| 5,954,510 A | 9/1999 | Merrill et al. |
| 5,978,729 A | 11/1999 | Landes et al. |
| (Continued) | | |

FOREIGN PATENT DOCUMENTS

| | | |
|---|---|---|
| AU | 2008216988 A1 | 4/2010 |
| WO | 2001018531 A1 | 3/2001 |
| (Continued) | | |

OTHER PUBLICATIONS

"Parents Invent Device to Track Teen Driving Habits" http://www.autoblog.com/2014/03/12/parents-invent-device-to-track-teen-driving-habits/ May 12, 2014.
(Continued)

*Primary Examiner* — Nader Bolourchi
(74) *Attorney, Agent, or Firm* — Banner & Witcoff, Ltd.

(57) ABSTRACT

Methods, computer-readable media, software, and apparatuses that may facilitate communications to rate driver performance and provide a driver rating to a driver in a competitive manner are provided. Driver computing devices may collect drive data (e.g., vehicle telematics data) to determine whether conditions are met (i.e., whether a driver speeds, brakes hard, or drives at night). The system may generate a driver rating based on these conditions. The rating may be used in a competitive manner (such as by sharing ratings with friends) and rewards given for good performance (such as new levels for display in a social environment, or financial incentives such as charitable donation or sweepstakes entry).

20 Claims, 6 Drawing Sheets

(56) References Cited

U.S. PATENT DOCUMENTS

| | | |
|---|---|---|
| 6,227,862 B1 | 5/2001 | Harkness |
| 6,488,505 B1 | 12/2002 | Hightower |
| 7,375,624 B2 | 5/2008 | Hines et al. |
| 7,397,365 B2 | 7/2008 | Wang |
| 7,659,827 B2 | 2/2010 | Gunderson et al. |
| 7,769,629 B1 | 8/2010 | Kriza et al. |
| 7,821,421 B2 | 10/2010 | Tamir et al. |
| 8,085,166 B2 | 12/2011 | Tamir et al. |
| 8,086,523 B1 | 12/2011 | Palmer |
| 8,140,359 B2 | 3/2012 | Daniel |
| 8,217,772 B2 | 7/2012 | Morgan et al. |
| 8,380,640 B2 | 2/2013 | Olsen, III et al. |
| 8,510,200 B2 | 8/2013 | Pearlman et al. |
| 8,594,861 B2 | 11/2013 | Rovik et al. |
| 8,653,986 B2 | 2/2014 | Tamir et al. |
| 8,751,563 B1 | 6/2014 | Warden et al. |
| 8,930,227 B1 | 1/2015 | Nepomuceno |
| 2002/0111725 A1 | 8/2002 | Burge |
| 2002/0186144 A1 | 12/2002 | Meunier |
| 2004/0210353 A1 | 10/2004 | Rice |
| 2005/0171663 A1 | 8/2005 | Mittelsteadt et al. |
| 2005/0173523 A1 | 8/2005 | Yushio et al. |
| 2006/0047540 A1 | 3/2006 | Hutten et al. |
| 2007/0005404 A1 | 1/2007 | Raz et al. |
| 2007/0027583 A1 | 2/2007 | Tamir et al. |
| 2007/0027726 A1 | 2/2007 | Warren et al. |
| 2007/0174004 A1 | 7/2007 | Tenzer et al. |
| 2007/0185728 A1 | 8/2007 | Schwarz et al. |
| 2007/0203625 A1 | 8/2007 | Quigley et al. |
| 2008/0065427 A1 | 3/2008 | Helitzer et al. |
| 2008/0082372 A1 | 4/2008 | Burch |
| 2008/0243558 A1 | 10/2008 | Gupte |
| 2008/0255722 A1 | 10/2008 | McClellan et al. |
| 2008/0261680 A1 | 10/2008 | Buecheler et al. |
| 2008/0268816 A1 | 10/2008 | Wormald |
| 2008/0270519 A1 | 10/2008 | Ekdahl et al. |
| 2009/0024419 A1 | 1/2009 | McClellan et al. |
| 2009/0079555 A1 | 3/2009 | Aguirre De Carcer et al. |
| 2009/0284361 A1 | 11/2009 | Boddie et al. |
| 2010/0030582 A1 | 2/2010 | Rippel et al. |
| 2010/0030586 A1 | 2/2010 | Taylor et al. |
| 2010/0157061 A1 | 6/2010 | Katsman et al. |
| 2010/0205012 A1 | 8/2010 | McClellan |
| 2010/0209892 A1 | 8/2010 | Lin et al. |
| 2010/0238009 A1 | 9/2010 | Cook et al. |
| 2010/0250021 A1 | 9/2010 | Cook et al. |
| 2010/0280935 A1 | 11/2010 | Fellowes et al. |
| 2010/0299021 A1 | 11/2010 | Jalili |
| 2010/0311017 A1 | 12/2010 | Coil et al. |
| 2010/0332266 A1 | 12/2010 | Tamir et al. |
| 2011/0009107 A1 | 1/2011 | Guba et al. |
| 2011/0040579 A1 | 2/2011 | Havens |
| 2011/0059754 A1 | 3/2011 | Cai et al. |
| 2011/0077028 A1 | 3/2011 | Wilkes, III et al. |
| 2011/0090075 A1 | 4/2011 | Armitage et al. |
| 2011/0106370 A1 | 5/2011 | Duddle et al. |
| 2011/0145042 A1 | 6/2011 | Green et al. |
| 2011/0160964 A1 | 6/2011 | Obradovich |
| 2011/0171663 A1 | 7/2011 | Smith et al. |
| 2011/0254655 A1 | 10/2011 | Maalouf et al. |
| 2011/0320492 A1 | 12/2011 | Inghelbrecht |
| 2012/0066007 A1 | 3/2012 | Ferrick et al. |
| 2012/0069131 A1 | 3/2012 | Abelow |
| 2012/0071151 A1 | 3/2012 | Abramson et al. |
| 2012/0089423 A1 | 4/2012 | Tamir et al. |
| 2012/0116936 A1 | 5/2012 | Keniry et al. |
| 2012/0135382 A1 | 5/2012 | Winston et al. |
| 2012/0140688 A1 | 6/2012 | Hering et al. |
| 2012/0185282 A1 | 7/2012 | Gore et al. |
| 2012/0232749 A1 | 9/2012 | Schoenberg et al. |
| 2012/0253670 A1 | 10/2012 | Nagda |
| 2013/0006674 A1 | 1/2013 | Bowne et al. |
| 2013/0018677 A1 | 1/2013 | Chevrette |
| 2013/0090821 A1 | 4/2013 | Abboud et al. |
| 2013/0151111 A1 | 6/2013 | Skelton |
| 2013/0164715 A1 | 6/2013 | Hunt et al. |
| 2013/0179027 A1 | 7/2013 | Mitchell |
| 2013/0185124 A1 | 7/2013 | Aaron et al. |
| 2013/0204517 A1 | 8/2013 | Raju et al. |
| 2013/0204645 A1 | 8/2013 | Lehman et al. |
| 2013/0217331 A1 | 8/2013 | Manente |
| 2013/0226369 A1 | 8/2013 | Yorio et al. |
| 2013/0261874 A1* | 10/2013 | McQuade ............... F02D 29/02 701/29.1 |
| 2013/0261907 A1 | 10/2013 | McQuade et al. |
| 2013/0302758 A1 | 11/2013 | Wright |
| 2013/0310053 A1 | 11/2013 | Srivastava et al. |
| 2013/0311250 A1 | 11/2013 | Hickethier et al. |
| 2013/0317665 A1 | 11/2013 | Fernandes et al. |
| 2013/0337417 A1 | 12/2013 | Nepomuceno |
| 2013/0338914 A1 | 12/2013 | Weiss |
| 2014/0045473 A1 | 2/2014 | Salisbury et al. |
| 2014/0113619 A1 | 4/2014 | Tibbitts et al. |
| 2014/0163848 A1 | 6/2014 | Tamir et al. |
| 2014/0195272 A1 | 7/2014 | Sadiq et al. |
| 2014/0278574 A1 | 9/2014 | Barber |
| 2015/0174486 A1 | 6/2015 | Brunn |
| 2015/0274062 A1 | 10/2015 | Wen |
| 2017/0041737 A1* | 2/2017 | Fischer ............... H04W 64/006 |

FOREIGN PATENT DOCUMENTS

| | | |
|---|---|---|
| WO | 2005003885 A2 | 1/2005 |
| WO | 2011057217 A2 | 5/2011 |
| WO | 2011128873 A2 | 10/2011 |
| WO | 2012109742 A2 | 8/2012 |
| WO | 2012166059 A2 | 12/2012 |

OTHER PUBLICATIONS

"Teen Vehicle Tracking" http://www.safewatch360.com/applications/family-personal/teenvehicletracking/ site last iisited on Oct. 15, 2015.

"Apps for Parents to Monitor Teen Driving Habits: Safe Driving Tools" http://blog.cochran.com/wordpress/index.php/apps-monitor-teen-drivers/ site last visited on Oct. 15, 2015.

"Zubie | Making Driving Easier, Safer and Less Expensive" http://zubie.com/ site last visited on Oct. 15, 2015.

Megan Kowalski et al. "Apps, etc. remotely monitor teen drivers" http://www.usatoday.com/story/money/cars/2013/07/17parents-monitor-teen-driving/2482753 Jul. 18, 2013.

"The Safe Driver App from AAMI" http://www.aami.com.au/car-insurance/safe-driver-smartphone-app.html site last visited on Oct. 15, 2015.

"mbrace Your World, From Your Car" Mercedes-Benz mbrace, #1527 Rev. 8.13.13.

"Business Mobile Phone or Vehicle Tracking" https://www.youtube.com/watch?v=smeCZpgveU, video, last visited Feb. 3, 2015.

"Teen GPS Tracking" http://gpsandtrack.com/teen-gps-tracking/, last visited Nov. 12, 2013.

"Autonet Mobile" http://www.autonetmobile.com/apps/, last visited on Feb. 3, 2015.

Michael P. O'Donnell, "Should Employees Get Insurance Discounts for Completing Wellness Programs?" http://www.wsj.com/articles/SB10001424127887324610545782736731984 9976 Feb. 18, 2013.

"Ways to Get Affordable Auto Insurance" http://www.21st.com/auto-insurance-information/discount-car-insurance.htm, 21st Century Insurance, last visited on Feb. 10, 2015.

"Confused.com rewards good driving with a new mobile phone app" http://www.confused.com/press/releases/confused-com-rewards-good-driving-with-a-new-mobile-phone-app, last visited Feb. 10, 2015.

"Driver Awards" http://w3.primeinc.com/driver-awards, last visited Feb. 10, 2015.

"ABF Proudly Recognizes 4944 Drivers Who Have Earned Safe Driving Awards", http://www.abfs.com/about/news/employee/safedriving.asp, Aug. 26, 2013.

"Guidelines for Employers to Reduce Motor Vehicle Crashes" https://www.osha.gov/Publications/motor_vehicle_guide.html, Aug. 26, 2013.

(56) References Cited

OTHER PUBLICATIONS

"Commercial Motor Vehicle Driver Retention and Safety" U.S. Department of Transportation Federal Motor Carrier Safety Administration, Publication No. FMCSA-RT-04-002 Oct. 2003.
"Auto Insurance Discounts" https://www.libertymutual.com/auto-insurance/auto-insurance-discounts, Aug. 26, 2013.
"GTA-SanAndreas.com—Driving School Guide" http://www.gta-sanandreas.com/guides/drivingschool/, Aug. 26, 2013.
Rob Schneider, "Insurance Underwriting and Credit Scores", Consumer Union, Jan. 2003.
Manitoba Public Insurance, "Moving Toward a Better Driver Rating System" dated 2008.
Chris Tijerina, "Flow Your Auto Insurance Rates Are Determined", Ezine Articles, date unknown captured May 9, 2012.
Neighborhood Link Website, Your Credit Score Affects Your Auto Insurance Rates, date unknown captured May 9, 2012.
Robin Harbage, "Usage-based Auto Insurance (UBI)" © 2010 Towers Watson.
MyDrive Solutions website, "How does MyDrive work?", date unknown, captured May 9, 2012.
Computer Weekly Website, "How pay-as-you-behave technology could transform car insurance", published Apr. 4, 2011.
Farmers Essential Life Â® Universal Life Website; "Universal Life Insurance Designed to Be Flexible to Fit Your Needs", www.farmers.com/universal_life_insurance.html; date unknown, captured May 9, 2012.
Golden State Mutual Life Website; "Introducing Universal Life Insurance", www.gsmlife.com/universal life-Conserv.htm; date unknown, captured May 9, 2012.
Non-Final Office Action for related U.S. Appl. No. 13/770,622 dated Sep. 29, 2014.
Notice of Allowance for related U.S. Appl. No. 13/770,622 dated Feb. 12, 2015.
Dec, 4, 2015—U.S. Non Final Rejection—U.S. Appl. No. 14/505,014.
Jun. 27, 2016—U.S. Office Action—U.S. Appl. No. 14/505,014.
Nov. 3, 2016—U.S. Non-Final Office Action—U.S. Appl. No. 14/505,014.
Apr, 4, 2017—U.S. Non-Final Office Action—U.S. Appl. No. 14/883,186.
May 15, 2017—U.S. Notice of Allowance—U.S. Appl. No. 14/505,014.
Jun. 7, 2017—U.S. Corrected Notice of Allowability—U.S. Appl. No. 14/505,014.
Jul. 12, 2017—U.S. Notice of Allowance—U.S. Appl. No. 14/883,186.
Aug. 16, 2017—U.S. Office Action—U.S. Appl. No. 14/685,761.
Oct. 4, 2017—U.S. Notice of Allowance—U.S. Appl. No. 14/883,186.
Jan. 4, 2018—U.S. Final Office Action—U.S. Appl. No. 14/685,761.
Mar. 29, 2018—U.S. Notice of Allowance—U.S. Appl. No. 15/861,884.

\* cited by examiner

DRIVER PERFORMANCE RATINGS

CROSS REFERENCE TO RELATED APPLICATIONS

This application is a continuation of U.S. patent application Ser. No. 15/861,884 filed Jan. 4, 2018, entitled "DRIVER PERFORMANCE RATINGS," which is a continuation of U.S. patent application Ser. No. 14/883,186 filed Oct. 14, 2015, entitled "DRIVER PERFORMANCE RATINGS," which issued as U.S. Pat. No. 9,892,573 on Feb. 13, 2018, all of which are incorporated herein by reference.

FIELD OF ART

Aspects of the disclosure generally relate to methods and computer systems, including one or more computers particularly configured and/or executing computer software. More specifically, aspects of this disclosure relate to systems for capturing, evaluating, and communicating vehicle telematics to encourage safe driving behavior.

BACKGROUND

People and organizations, such as auto-insurance companies or providers, may collect and/or analyze vehicle telematics data for a variety of purposes. Vehicle telematics data includes various data from measurements related to a vehicle's operation. For example, vehicle telematics data may include global positioning system (GPS) coordinates of an automobile that allow the location of the automobile to be tracked. Also, for example, vehicle telematics data may include acceleration data of an automobile that allows the speed of the automobile to be tracked. Insurance providers may use this information, in some examples, to evaluate the risk of customers and potential customers. Other organizations may also be interested in such information to determine a person's driving behavior. Moreover, drivers, parents or other guardians of drivers, insurance providers, and the like, may desire to use this data to encourage safe driving behaviors.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure address one or more of the issues mentioned above by disclosing methods, computer readable storage media, software, systems, and apparatuses for providing a driving analysis system that may facilitate rating the performance of a driver in a competitive fashion using vehicle telematics. This may encourage better driving performance by allowing drivers to voluntarily compete in a fun atmosphere, while providing incentives such as feedback and rewards.

Aspects of this disclosure provide a driving analysis system comprising a first vehicle on-board data recording system and/or a mobile associated with a first user who may drive a vehicle and/or a driving analysis server. In some embodiments, the first user may be a driver (i.e., a teenager) and the first computing device may be the driver's smartphone. The first vehicle on-board data recording system or mobile device may be configured to collect drive data (e.g., vehicle telematics data) representing the driving behavior of the vehicle. The first vehicle on-board data recording system or mobile device may also be configured to transmit information based on the drive data. The driving analysis server may receive the drive data, determine performance ratings based on the drive data, and determine if the ratings exceed a threshold. If the ratings do exceed a threshold, the driving analysis server may increase a "rating streak," and check to see if the streak has reached a rating streak threshold sufficient for the driver to advance to a new level. If the ratings are insufficient to meet the threshold, the driving analysis server may reset the rating streak.

Aspects of the disclosure further provide a method of rewarding good driving through rewards such as levels, charitable contributions, sweepstakes entries, and/or messages to friends and family. Drivers may follow each other using an application presenting performance information and/or messages associated with other drivers. The method may also include determining whether the user is driving the vehicle during the trip.

Of course, the methods and systems of the above-referenced embodiments may also include other additional elements, steps, computer-executable instructions, or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example and is not limited by the accompanying figures in which like reference numerals indicate similar elements and in which.

DETAILED DESCRIPTION

In accordance with various aspects of the disclosure, methods, computer-readable media, software, and apparatuses are disclosed that provide a vehicle with a telematics management system for rating a driver's driving performance and presenting that rating to a driver in a competitive manner. The vehicle telematics management system may allow a driver or other user to monitor the driving performance of a driver, share the driving performance data, and/or receive rewards for their driving performance. For example, the vehicle telematics system may generate a rating for a driver based on driving behaviors (as determined, for instance, from vehicle telematics data), such as speeding and braking, and allow the driver to publish their driving performance (such as by sharing a driver rating or level earned based on the rating via, for instance, social media). In some instances, a monetary or financial reward may be given for good driving, which may be given to the driver or to a third party (such as a charity). In some instances, the system may penalize the driver and/or generate audio or visual notifications if performance metrics are not met (e.g., driving outside a geo-fence, driving at high speeds, braking too hard, cornering too hard, etc.). The vehicle telematics management system may evaluate vehicle telematics data and communicate notifications to an insurance provider, parent or other guardian of the driver, or other entity if certain conditions are met, such as meeting performance ratings based on the one or more performance metrics (e.g., speed restrictions, acceleration/deceleration restrictions, night time driving, etc.). Such communications may be governed by or limited based on permissions granted by the driver, parent or guardian of the driver, and the like.

In some arrangements, the performance ratings may be used to create a competitive environment (e.g., virtual environment of competition) in order to encourage drivers to practice safe driving habits. The competitive environment may have a video game-like arrangement and may provide incentives. A driver may enroll voluntarily. For example, a teen driver may not wish to be mandatorily enrolled by her parents in a performance tracking system, and may attempt to circumvent the system if her parents do force her to enroll (such as by leaving her cell phone at home). By using game mechanics, such as high scores and driving streaks, the teen driver may actively use the system, which may promote safe driving behaviors that may benefit the teen driver, the teen driver's parents, an insurance provider of the teen, as well as any other individuals sharing the road with the teen driver.

Although various aspects described herein may be discussed in the context of a teenage or "teen" driver, the systems and arrangements described herein may be used by drivers of any age or experience level to encourage and/or reward safe driving habits and behaviors.

The vehicle telematics management system may be implemented using mobile user devices (e.g., smartphones, tablet computing devices, laptops, etc.). For example, a driver's smartphone may be configured to collect and evaluate vehicle telematics data using vehicle operation sensors (e.g., using sensors within the mobile device and/or by communicating with sensors arranged in a vehicle). The smartphone may compile tabulated metrics and transmit those metrics to a server. Some aspects include transmitting a notification after particular driving behaviors have occurred, such as a hard-braking event, a vehicle exceeding a certain speed, and/or a vehicle is traveling after dark, in inclement weather, or the like.

The vehicle telematics management system may also automatically detect when a vehicle starts and stops, thereby facilitating collection of vehicle telematics data. For example, a driver's smartphone may execute an application in the background so that it may automatically detect when the driver is in a moving vehicle. As such, a number of steps to be performed by the driver for the collection of vehicle telematics data may be reduced. In other words, aspects of the system may reduce the likelihood that a driver may forget to activate the system or intentionally not use the system due to inconvenience.

As described herein, aspects of the vehicle telematics management system may be accomplished by implementing a suite of computer programs. Different programs of the suite of programs may be executed by different devices to perform different functions. For example, driver computing devices may collect telematics data, while server devices may process that data into ratings and/or streaks (e.g., a number of consecutive ratings of a predetermined level). While different programs may be installed and executed on different devices, any device disclosed herein may execute any of the programs. Further, in some embodiments, the suite of programs may be implemented as different modules of a single program and the different devices may execute the different modules. The predetermined threshold value needed for a drive to count in a streak may also change depending on the level and/or the user. For example, a streak at level two may have a threshold value of eighty, while a streak at level three may have a threshold value of eighty-five.

In some instances, credits or strikes may be afforded before a streak is reset. For example, if a driver needs a streak of ten drives beyond a threshold value to reach the next level, the driver may be given three credits which will forgive the driver for three drives that fail to reach the threshold value. For example, if the user scores eighty but the threshold value is eighty-five, a streak may not disappear, but one of three credits may disappear. After the three credits are used, if the user scores under the threshold value again, then the streak may reset to zero. In some instances, an unlimited number of credits or strikes may be afforded (e.g., no streak is required), such that the count of scores over a threshold value (whether consecutive or not) may determine achieving the next level. For example, a driver may only need to have five good drives, which need not be in continuous, to achieve level two but may need a streak of ten good drives thereafter to achieve level three.

The ratings or streaks may be used to generate a leveling system. For example, a driver may be awarded a rating for each drive or trip. If a rating meets a predetermined value, it may increase a number of consecutive ratings above a threshold in a streak (or reset the streak (e.g., to zero) if it does not). If, by meeting the predetermined value and thereby increasing the number of consecutive ratings in the steak, the streak contains at least a predetermined number of drives, the driver may receive or be promoted to an increased level (e.g., the next higher level in the competitive environment). Each level may require a larger or longer streak than the level before it. Further, rewards may be given based on the ratings. For example, monetary rewards may be given for obtaining a level, a certain size streak, a predetermined number of perfect scores in a time period, or other such threshold.

These ratings, streaks, levels, and rewards may be shared between users. For example, a driver may have a list of friends, and may be able to share their ratings, streaks, levels, and/or rewards between friends. This may promote better driving through a competitive, game-like atmosphere.

In the following description of the various embodiments of the disclosure, reference is made to the accompanying drawings, which form a part hereof, and in which is shown by way of illustration, various embodiments in which the disclosure may be practiced. It is to be understood that other embodiments may be utilized, and structural and functional modifications may be made.

Figure 1:
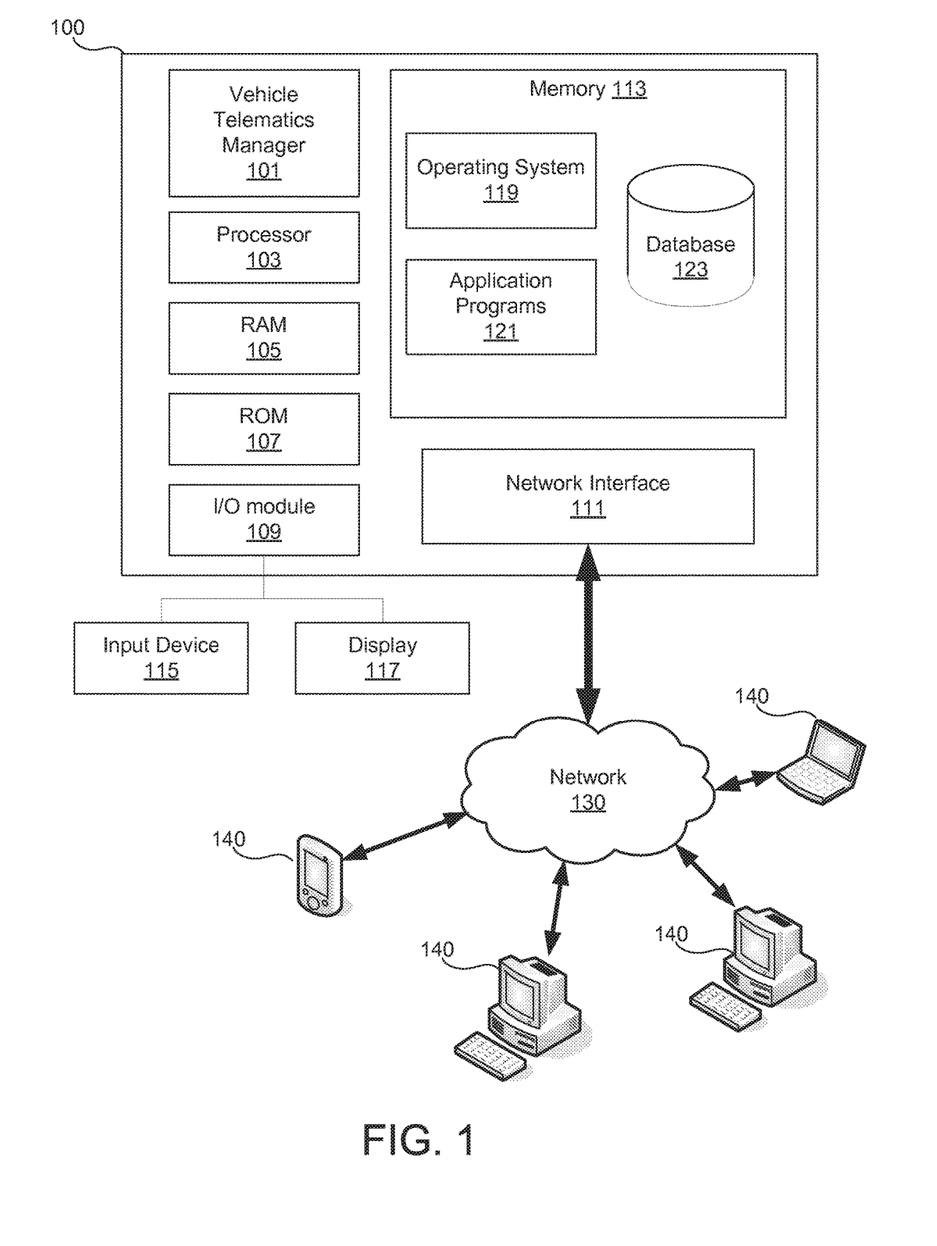
FIG. 1 is a block diagram of an example computing device or environment that may be used in accordance with one or more aspects described herein.

In one or more arrangements, aspects of the present disclosure may be implemented with a computing device. FIG. 1 illustrates a block diagram of an example computing device 100 that may be used in accordance with aspects described herein. The computing device 100 may be similar to any available computing device, such as a personal computer (e.g., a desktop computer), server, laptop computer, notebook, tablet, smartphone, etc. The computing device 100 may have a vehicle telematics manager 101 for performing methods and executing instructions of the vehicle telematics management program(s) described herein. The vehicle telematics manager 101 may be implemented with one or more processors and one or more storage units (e.g., databases, RAM, ROM, and other computer-readable media), one or more application specific integrated circuits (ASICs), and/or other hardware components (e.g., resistors, capacitors, power sources, switches, multiplexers, transistors, inverters, etc.). Throughout this disclosure, the vehicle telematics manager 101 may refer to the software and/or hardware used to implement the vehicle telematics manager 101. In cases where the vehicle telematics manager 101 includes one or more processors, such processors may be specially configured to perform the processes disclosed herein. Additionally, or alternatively, the vehicle telematics manager 101 may include one or more processors configured to execute computer-executable instructions, which may be stored on a storage medium, to perform the processes disclosed herein. In some examples, the computing device 100 may include one or more processors 103 in addition to, or instead of, the vehicle telematics manager 101. The processor(s) 103 may be configured to operate in conjunction with vehicle telematics manager 101. Both the vehicle telematics manager 101 and the processor(s) 103 may be capable of controlling operations of the computing device 100 and its associated components, including RAM 105, ROM 107, an input/output (I/O) module 109, a network interface 111, and memory 113. For example, the vehicle telematics manager 101 and processor(s) 103 may each be configured to read/write computer-executable instructions and other values from/to the RAM 105, ROM 107, and memory 113.

The I/O module 109 may be configured to be connected to an input device 115, such as a microphone, keypad, keyboard, touchscreen, and/or stylus through which a user of the computing device 100 may provide input data. The I/O module 109 may also be configured to be connected to a display device 117, such as a monitor, television, touchscreen, etc., and may include a graphics card. The display device 117 and input device 115 are shown as separate elements from the computing device 100; however, they may be within the same structure. Using the input device 115, system administrators may update various aspects of the vehicle telematics management program, such as rules for collecting vehicle telematics data, rules for detecting vehicle starts and stops, rules for detecting violations of restrictions, and rules for providing notifications, warnings, and parameter changes, such as information to be communicated in these communications and data structures to use for these communications. On some computing devices 100, the input device 115 may be operated by users to interact with the vehicle telematics management program, including providing user information and/or preferences, vehicle information (e.g., make and model of a vehicle), account information, parameters for setting restrictions, warning/suggestion messages, etc., as described in further detail below. System administrators may use the input device 115 to make updates to the vehicle telematics management system, such as software updates. Meanwhile, the display device 117 may assist the system administrators and users to confirm/appreciate their inputs.

The memory 113 may be any computer-readable medium for storing computer-executable instructions (e.g., software). The instructions stored within memory 113 may enable the computing device 100 to perform various functions. For example, memory 113 may store software used by the computing device 100, such as an operating system 119 and application programs 121, and may include an associated database 123.

The network interface 111 allows the computing device 100 to connect to and communicate with a network 130. The network 130 may be any type of network, including a local area network (LAN) and/or a wide area network (WAN), such as the Internet, a cellular network, or satellite network. Through the network 130, the computing device 100 may communicate with one or more other computing devices 140, such as laptops, notebooks, smartphones, tablets, personal computers, servers, etc. The computing devices 140 may also be configured in a similar manner as computing device 100. In some embodiments the computing device 100 may be connected to the computing devices 140 to form a "cloud" computing environment.

The network interface 111 may connect to the network 130 via communication lines, such as coaxial cable, fiber optic cable, etc., or wirelessly using a cellular backhaul or a wireless standard, such as IEEE 802.11, IEEE 802.15, IEEE 802.16, etc. In some embodiments, the network interface may include a modem. Further, the network interface 111 may use various protocols, including TCP/IP, Ethernet, File Transfer Protocol (FTP), Hypertext Transfer Protocol (HTTP), etc., to communicate with other computing devices 140.

FIG. 1 is an example arrangement of a computing device 100. In other arrangements, the computing device 100 may include fewer or more elements. For example, the computing device 100 may use the processor(s) 103 to perform functions of the vehicle telematics manager 101, and thus might not include a separate processor for the vehicle telematics manager 101. Or, for example, the computing device 100 may be a mobile device (e.g., a smartphone, tablet, etc.), and thus may also include various other components, such as a battery, speaker, and/or antennas (not shown). Also, the computing device 100 may be an on-board vehicle computing device 100 (either installed by a vehicle manufacturer or as an aftermarket part) having vehicle-compatible elements, such as a port for an on-board diagnostic connector or ports for other vehicle operation sensors (e.g., tire pressure sensors, engine temperature sensors, etc.).

Figure 2:
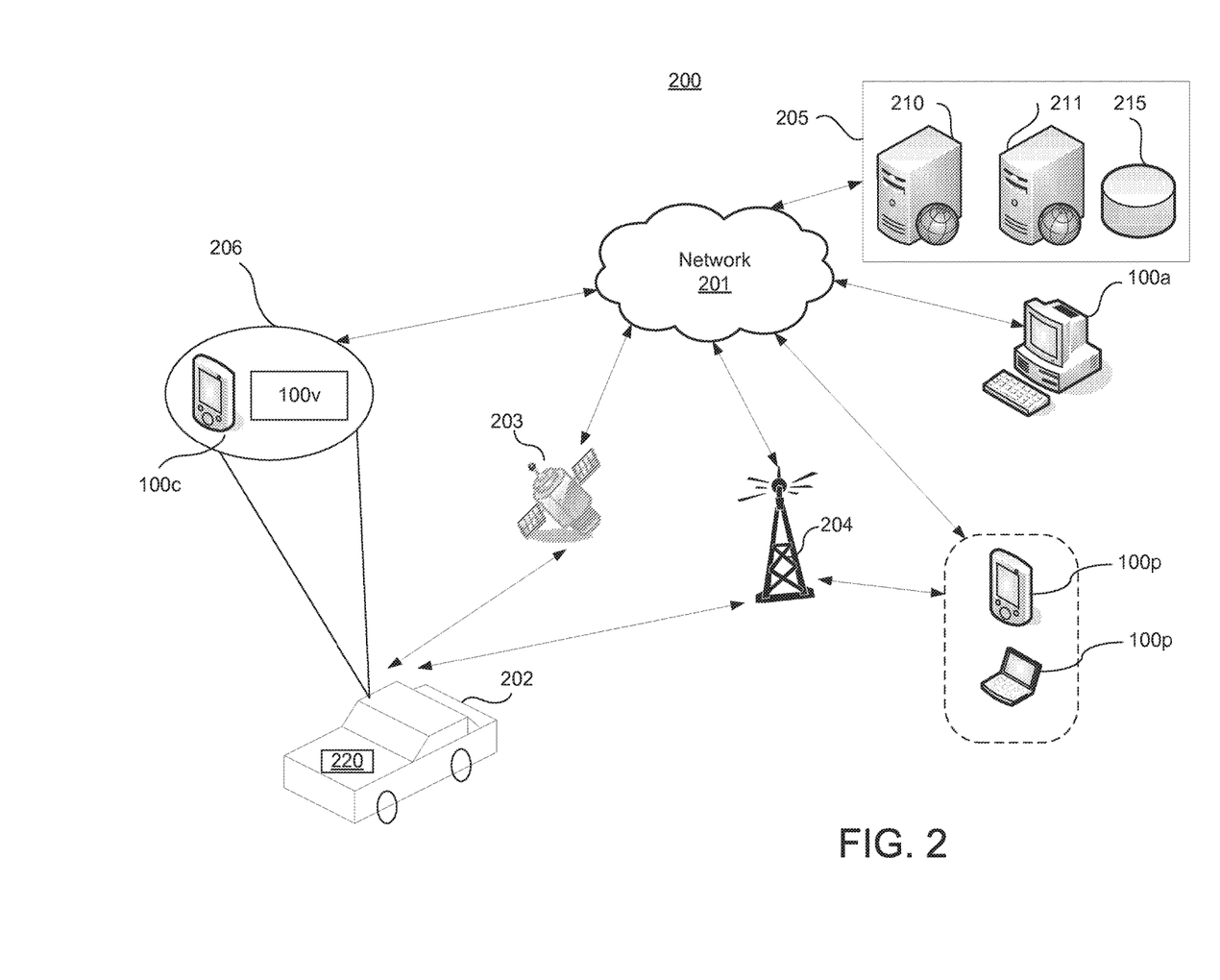
FIG. 2 illustrates an example network environment in which a system in accordance with one or more aspects described herein may be implemented.

The methods and software for capturing and communicating vehicle telematics data as disclosed herein may be implemented on one or more computing devices 100 used in various network environments. FIG. 2 illustrates an example network environment 200 for implementing methods according to aspects described herein. As shown in FIG. 2, the network environment 200 may include a network 201 configured to connect computing devices within or associated with a vehicle 202 (e.g., driver computing device 100*c* or vehicle computing device 100*v*), satellites 203, cellular network elements 204 (e.g., cell towers), one or more administrative computing devices 100*a*, one or more driving analysis servers 205, and one or more friend's computing devices 100*p*. Collectively, one or more of these computing devices may form a vehicle telematics management system.

The network 201 may be any type of network, like the network 130 described above, and use one or more communication protocols (e.g., protocols for the Internet (IP), Bluetooth, cellular communications, satellite communications, etc.) to connect computing devices and servers within the network environment 200 so they may send and receive communications (e.g., notifications shown as dashed arrows) between each other. In particular, the network 201 may include a cellular network and its components, such as base stations. Accordingly, for example, a driver computing device 100c (e.g., a first smartphone) of a teenager in vehicle 202 may communicate, via a cellular backhaul of the network 201, with a driving analysis server 205, which in turn may communicate, via the cellular backhaul of the network 201, with a friend's computing device 100p (e.g., another smartphone) to provide notifications regarding vehicle 202's performance. While FIG. 2 depicts arrows pointing to the vehicle 202, it should be understood that the connections may be made with the driver computing device 100c and/or vehicle computing device 100v within the vehicle 202. For example, the driver computing device 100c and/or vehicle computing device 100v may communicate with a satellite 203 to obtain GPS coordinates or to transfer notifications to the network 201 through the satellite 203. Further, it should be understood that the driver computing device 100c (e.g., a smartphone) may connect to the network 201 even if it is removed from the vehicle 202.

FIG. 2 illustrates one vehicle 202. However, the vehicle telematics management system may be configured to communicate with multiple vehicles 202 simultaneously. For example, the driving analysis server 205 may collect information from a large number of vehicles and allow users to choose to share their performance (e.g., driver levels) with each other.

Also, although FIG. 2 depicts the vehicle 202 as a car, the vehicle 202 may be any type of vehicle, including a motorcycle, bicycle, scooter, drone (or other automated device), truck, bus, boat, plane, recreational vehicle, helicopter, etc.

FIG. 2 also illustrates an example subsystem 206 within the network environment 200. Specifically, the example subsystem 206 illustrates an example arrangement of computing devices that may exist within the vehicle 202 (and other vehicles not shown). As shown in FIG. 2, the vehicle 202 may include a driver computing device 100c and/or a vehicle computing device 100v. In some arrangements, the driver computing device 100c and vehicle computing device 100v may communicate with one another (e.g., via Bluetooth or other communication protocol). The driver computing device 100c may be any mobile computing device (e.g., a smartphone, tablet, etc.) that is associated with a driver or individual whether they are a driver or passenger of the vehicle 202. The driver computing device 100c may be configured in a similar manner to the computing device 100 of FIG. 1.

In some embodiments, the driver computing device 100c and/or vehicle computing device 100v may also be configured to collect drive data using various sensors, e.g., an accelerometer, GPS, gyroscope, etc. of the driver computing device 100c, sensors 220 of the vehicle 202, or the vehicle computing device 100v, or a combination thereof. Drive data may include vehicle telematics data or any other data related to events occurring during a vehicle's trip (e.g., an impact to a part of the vehicle, a deployed airbag, windshield wiper use, headlight use, braking habits, speed, banking, etc.). For example, drive data may include location information such as GPS coordinates that indicate the geographical location of the driver computing device 100c as well as speed and acceleration data that may be used to detect speeding (e.g., exceeding a predefined speed or known speed limit) and hard-braking events. The driver computing device 100c or vehicle computing device 100v may be further configured to evaluate the drive data and to send notifications to the vehicle telematics management system (e.g., driving analysis server 205). In particular, the driver computing devices 100c and/or vehicle computing device 100v may send the results for a given drive to the driving analysis server 205.

Further, the driver computing device 100c may be configured to execute a driver device program that provides computer-executable instructions for collecting and communicating vehicle telematics data as well as a user interface for a driver (or other individual) in order to provide inputs to and receive outputs from the vehicle telematics management system. Such a driver device program may be downloaded or otherwise installed onto the driver computing device 100c using known methods. Once installed onto the driver computing device 100c, a user may launch the driver device program by, for example, operating buttons or a touchscreen on the driver computing device 100c. Additionally, or alternatively, the driver computing device 100c may be configured to execute a web browser (e.g., an application for accessing and navigating the Internet) to access a web page that provides an interface for the vehicle telematics management system.

Although FIG. 2 depicts driver computing device 100c within the vehicle 202, the vehicle may contain more or fewer driver computing devices 100c in some cases. For example, the vehicle 202 may carry one or more passengers in addition to the driver, and each person may have one or more driver computing devices 100c. If another individual is a passenger, he may be able to select an option on his mobile device indicating that he is not the driver, which may prevent telematics information from being recorded even if it is set to record such information automatically. This may prevent the subsystem 206 from generating duplicate sets of telematics information for a single drive in a single vehicle 202. In some instances, the driver computing device may be linked to a vehicle ID, which may assist in identifying the driver. In some instances, other facts (such as driving behavior) may be used to identify the driver from among multiple computing devices present in the vehicle and associated with multiple people. In some instances, users in a carpool may designate who is the driver among the group and specify the scenario (e.g., every Wednesday, or every afternoon), and the system may then shut off the detection among all the non-drivers in the car to prevent generating duplicate sets of telematics information for a single drive.

The subsystem 206 may also include a vehicle computing device 100v (such as an on-board vehicle computing device) communicatively coupled to the vehicle 202 and/or the driver computing device 100c. The vehicle computing device 100v may be configured in a similar manner to the computing device 100 (e.g., including some or all of the components described with respect to computing device 100) of FIG. 1. Further, the vehicle computing device 100v may be configured to execute the driver device program in addition to, or instead of, the driver computing device 100c. In some cases, the vehicle computing device 100v and driver computing device may operate in conjunction so that the vehicle computing device 100v performs some modules of the driver device program while the driver computing device 100c performs other modules of the driver device program. For example, the vehicle computing device may collect drive data (e.g., vehicle telematics data) and communicate the drive data, via a wired (e.g., USB) or wireless (e.g., Bluetooth) connection, to a driver computing device 100c within the same vehicle 202 so that the driver computing device may evaluate the drive data and send notifications.

Further, the vehicle computing device 100v may be configured to connect to one or more devices (e.g., a GPS, sensors, etc.) installed on the vehicle 202 to collect the drive data. In some embodiments, the vehicle computing device 100v may be a system including multiple devices. For example, the vehicle computing device 100v may include the vehicle's on-board diagnostic (OBD) system. The vehicle computing device 100v may be configured to interface with one or more vehicle sensors (e.g., fuel gauge, tire pressure sensors, engine temperature sensors, accelerometers, braking sensors, etc.). The vehicle computing device may be configured to communicate directly or indirectly (e.g., through a driver computing device 100c) with the vehicle telematics management system. In some embodiments, there might not be a vehicle computing device 100v installed on the vehicle 202 that is configurable to interface with the vehicle telematics management system, or the vehicle computing device 100v might not be able to communicate with a driver computing device 100c.

Vehicle operation sensors 220 refer to a set of sensors and data detection devices associated with the vehicle 202 capable of detecting and recording various conditions at the vehicle and operational parameters of the vehicle. For example, sensors 220 may detect and store data corresponding to the vehicle's speed, distances driven, rates of acceleration or braking, and specific instances of sudden acceleration, braking, and swerving. Sensors 220 also may detect and store data received from the vehicle's 202 internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, maintenance performed on the vehicle, and other data collected by the vehicle's computer systems.

Additional sensors 220 may detect and store the external driving conditions, for example, external temperature, rain, snow, light levels, and sun position for driver visibility. Sensors 220 also may detect and store data relating to moving violations and the observance of traffic signals and signs by the vehicle 202. Additional sensors 220 may detect and store data relating to the maintenance of the vehicle 202, such as the engine status, oil level, engine coolant temperature, odometer reading, the level of fuel in the fuel tank, engine revolutions per minute (RPMs), and/or tire pressure.

The operational sensors 220 also may include one or more cameras and proximity sensors capable of recording additional conditions inside or outside of the vehicle 202. Internal cameras may detect conditions such as the number of the passengers in the vehicle 202, and potential sources of driver distraction within the vehicle (e.g., pets, phone usage, unsecured objects in the vehicle). External cameras and proximity sensors may detect other nearby vehicles, traffic levels, road conditions, traffic obstructions, animals, cyclists, pedestrians, and other conditions that may factor into a driving analysis.

The operational sensors 220 may store data within the vehicle 202, and/or may transmit the data to one or more external computer systems (e.g., a driving analysis server 205). As shown in FIG. 2, the operation sensors 220 may be configured to transmit data to a driving analysis server 205 via the subsystem 206. In other examples, one or more of the operation sensors 220 may be configured to transmit data directly without using the subsystem 206. For example, the subsystem 206 may be configured to receive and transmit some data from operational sensors 220, while other data may be transmitted by the vehicle 202 to the driving analysis server 205. Thus, sensors 220 within the vehicle 202 may be configured to independently capture, store, and transmit vehicle operation and driving data.

Subsystem 206 may be a computing device containing many or all of the hardware/software components as the computing device 100 depicted in FIG. 1. As discussed above, the subsystem 206 may receive vehicle operation and driving data from vehicle sensors 220 and may transmit the data to one or more external computer systems (e.g., a driving analysis server 205) over a wireless transmission network. Subsystem 206 also may be configured to detect or determine additional types of data relating to real-time driving and the condition of the vehicle 202. In certain embodiments, the subsystem 206 may contain or may be integral with one or more of the vehicle sensors 220 and/or with one or more additional sensors discussed below.

Additionally, the subsystem 206 may be configured to collect data regarding the number of passengers and the types of passengers (e.g. adults, children, teenagers, pets, etc.) in the vehicle 202. The subsystem 206 also may be configured to collect data a driver's movements or the condition of a driver. For example, the subsystem 206 may include or communicate with sensors that monitor a driver's movements, such as the driver's eye position and/or head position, etc. Additionally, the subsystem 206 may collect data regarding the physical or mental state of the driver, such as fatigue or intoxication. The condition of the driver may be determined through the movements of the driver or through sensors, for example, sensors that detect the content of alcohol in the air or blood alcohol content of the driver, such as a breathalyzer.

The subsystem 206 and/or driving analysis server 205 may also store the type of the vehicle 202, for example, the make, model, trim (or sub-model), year, and/or engine specifications. The vehicle type may be programmed by a user or customer, determined by accessing a remote computer system, such as an insurance company or financial institution server, or may be determined from the vehicle itself (e.g., by accessing the vehicles 202's computer systems).

In some embodiments, vehicle 202 carrying the driver may be autonomous or semi-autonomous and be operating in an autonomous mode (e.g., auto-pilot mode). An autonomously-controlled vehicle 202 may be controlled by its vehicle computing device 100v and/or a remote computing device via the network 201 or another network. The vehicle computing device 100v may employ sensors for inputting information related to a vehicle's surroundings (e.g., distance from nearby objects) and use the inputted information to control components of the vehicle 202 to drive the vehicle 202.

FIG. 2 further illustrates that the vehicle telematics management system may include one or more driving analysis servers 205. The driving analysis server 205 may be configured to receive notifications (which may include the raw vehicle telematics data or information indicating driving events) from subsystem 206 and process the notifications to determine if conditions are met (e.g., whether driving performance restrictions have been violated).

The driving analysis servers 205 may include hardware, software, and network components to receive vehicle operation data from the subsystem 206 and/or directly from the vehicle 202. Vehicle operation data may comprise data associated with the vehicle 202 such as speed information, braking information, time of day information, driving location, type of road being driven, driving behavior (e.g., smoothness of a drive), sound volume in the vehicle, and/or accelerometer information. The driving analysis server 205 and the subsystem 206 may be implemented as a single server/system, or may be separate servers/systems. In some examples, the driving analysis server 205 may be a central server configured to receive vehicle operation data from a plurality of remotely subsystems 206 associated with a plurality of vehicles 202.

As shown in FIG. 2, driving analysis server 205 may include a driving analysis module 210 and a driver rating calculation module 211. Modules 210 and 211 may be implemented in hardware and/or software configured to perform a set of specific functions within the driving analysis server 205. For example, the driving analysis module 210 and the driver rating calculation module 211 may include one or more driving analysis/driver score calculation algorithms, which may be executed by one or more software applications running on generic or specialized hardware within the driving analysis server 205. The driving analysis module 210 may use the vehicle operation data received from subsystem 206 and/or other systems to perform driving analyses for specific vehicles 202. The driver rating calculation module 211 may use the results of the driving analysis performed by module 210 to calculate or adjust a driver score for a driver of a vehicle 202 based on specific driving behaviors. Further descriptions and examples of the algorithms, functions, and analyses that may be executed by the driving analysis module 210 and the driver rating calculation module 211 are described below in reference to FIG. 3.

To perform driving analyses and driver score calculations, the driving analysis server 205 may initiate communication with and/or retrieve data from one or more vehicles 202, subsystems 206, and additional devices such as computing device 100p. For example, the databases 215 may store data corresponding to the amount of traffic and certain traffic characteristics (e.g., amount of traffic, average driving speed, traffic speed distribution, and numbers and types of accidents, etc.) at various specific locations and times. The databases may also store weather data (e.g., rain, snow, sleet, hail, temperature, wind, road conditions, visibility, etc.) at different locations and different times. The databases 215 in driving analysis server 205 may store additional driving data from one or more different data sources or providers which may be relevant to the driving analyses and/or driver score calculations performed by the driving analysis server 205. The databases 215 may store data regarding events such as road hazards and traffic accidents, downed trees, power outages, road construction zones, school zones, and natural disasters that may affect the driving analyses and/or driver score calculations performed by the driving analysis server 205. As discussed below in reference to FIG. 3, the driving analysis server 205 may retrieve and use data from databases and evaluate the driving behaviors of specific vehicles 202.

The driving analysis server 205 may use the information to create profiles including the various information collected for the drivers. For example, the driving analysis server 205 may store a plurality of profiles in databases 215 corresponding to a plurality of drivers associated with a plurality of vehicles 202. The driving analysis server 205 may share certain portions of the stored information, such as levels, streaks, or ratings, among the drivers. The profiles may be transmitted for display by the communicating with the driver computing device 100c and/or the friend's computing device 100p. In some arrangements, the driving analysis server 205 may broadcast events involving a profile. For example, the driving analysis server 205 may share a new level obtained by a driver using a driver computing device 100c on an interface of an authorized computing device 100p, and/or broadcast the new level via social media.

The administrative computing device 100a of FIG. 2 may be maintained and/or operated by an administrator of the vehicle telematics management system. For example, in a case where the vehicle telematics management system is provided by an insurance provider, the administrator may be any personnel of the insurance provider with authorization to make changes/updates to the system. System administrators may use the administrative computing device 100a to update the vehicle telematics management system. For example, the administrative computing device 100a may be used to prepare and deploy software updates to the driver device program or other software executing on devices within the system (e.g., software running on the driving analysis servers 205). The administrative computing device 100a may also be used by system administrators to ensure that the system is running smoothly. For example, the administrative computing device 100a may be used to check that driver computing devices 100c are sending notifications, and that the notifications are being properly routed. In some instances, the administrative computing device 100a may adjust feedback for one or more users based on analyzing and collecting data from driver computing device 100c and/or friend's computing device 100p.

Figure 3:
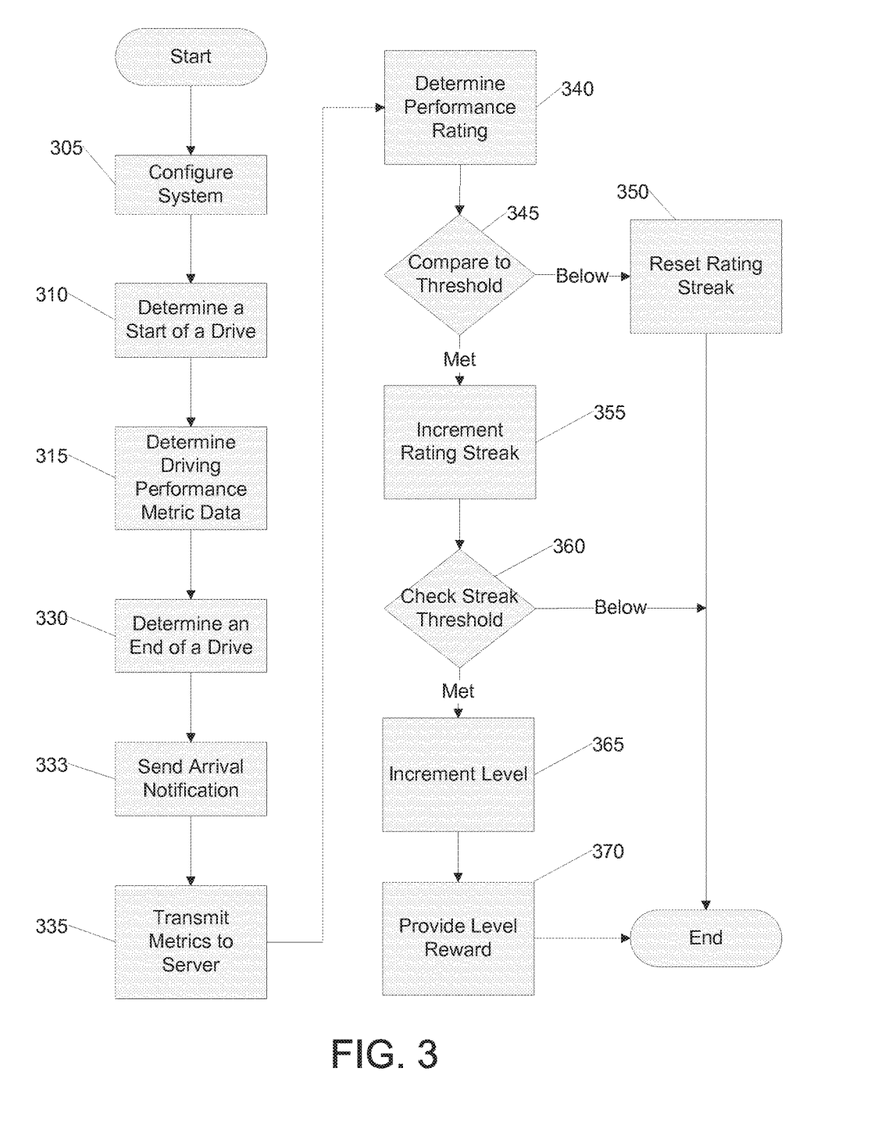
FIG. 3 illustrates a flow diagram for an example method in accordance with one or more aspects described herein.

FIG. 3 illustrates a flow diagram for an example method in accordance with aspects of the present disclosure. More specifically, FIG. 3 illustrates a plurality of steps of a method for collecting and communicating vehicle telematics data to facilitate rating driver performance according to one or more metrics. The steps of FIG. 3 may be performed by various devices disclosed herein, such as an administrative computing device 100a, a driver computing device 100c, a vehicle computing device 100v, a friend's computing device 100p, and/or an driving analysis server 205, of which some or all devices may form the vehicle telematics management system. In particular, one or more of the steps of FIG. 3 may be performed by executing a driver device program on a driver computing device 100c of the vehicle telematics management system.

The method of FIG. 3 may begin with a step 305 in which computing devices of the vehicle telematics management system are configured. In particular, step 305 may include configuring the driver computing device 100c to interface with the vehicle telematics management system so that notifications related to driving behavior may be transmitted to the system. Also, the driver computing device 100c may be configured to collect vehicle telematics data. This may include interfacing the driver computing device 100c with a vehicle computing device 100v and its sensors. Alternatively, or additionally, configuring the driver computing device 100c may include activating and/or calibrating a GPS, accelerometer, gyroscope, or other sensor of the driver computing device 100c. Further, configuring the driver computing device 100c may include installing an appropriate vehicle telematics management program, such as the driver device program, thereon. Different driver computing devices may install different versions of the driver device program depending on their platforms. For example, a driver computing device 100c running a first operating system may install a first version configured for that platform, while a driver computing device 100c running a second, different operating system may install a different version. Also, in some cases, step 305 may include a step of downloading the driver device program onto a driver computing device 100c from an administrative computing device 100a, driving analysis server 205, or another server or online marketplace.

The method may continue with determining that a drive has started in step 310. A computing device 100c may use information (e.g., acceleration or speed information as received from one or more sensing devices) to determine that the computing device 100*c* (and thus the vehicle) is in motion, and to indicate that a particular driving trip (e.g., the "drive") has begun. For example, a computing device 100*c* may include GPS and/or accelerometer data that indicates that the device has begun moving at a certain rate of speed. A device may use a Bluetooth or other connection to a vehicle 202 to transmit an indication that the computing device 100*c* is in proximity to the vehicle 202. In some instances, the computing device 100*c* may receive an input from a user (such as a button push, voice command, or other such input) indicating that a drive has begun. In some instances, the computing device 100*c* may detect consistent driving patterns (e,g., every weekday at 7 am) over time and may use the driving patters to determine likely drive start times. The computing device 100*c* may link the likely start times to a detection of a proximity to the vehicle 202 to determine more accurate start times.

In step 315, the computing device 100*c* may determine driving performance metric data for the drive based on, for instance, received telematics data. This data may include information about the driver, the vehicle, how the vehicle is being driven, details about the environment, or any other such information helpful for determining a driving performance rating.

In some arrangements, the computing device 100*c* may receive telematics information indicating that the vehicle 202 is traveling at a certain speed. In some instances, the computing device 100*c* may record the speed of the vehicle. In other instances, the computing device 100*c* may determine if the speed of the vehicle 202 exceeds a predetermined limit. For example, a driver may be restricted from exceeding 80 mph in their vehicle for more than 5 seconds at a time. If the driver exceeds that speed for more than 5 seconds, the computing device 100*c* may record the amount of time that the driver exceeds the speed. In some instances, the restricted speed may vary based on a speed limit. For example, the computing device 100*c* may obtain the speed limit for a road on which the vehicle is traveling, and the driver may be restricted from exceeding 5 mph over the speed limit. The computing device 100*c* may, in some examples, continually determine speed information for the duration of the drive.

In other arrangements, the computing device 100*c* may determine braking information for the drive based on the received telematics data. The computing device 100*c* may receive telematics information indicating hard braking events performed by vehicle 202. For example, the computing device 100*c* may record instances where the vehicle 202 decelerates beyond a predetermined threshold (such as by monitoring an accelerometer or GPS, or receiving data from a braking system of the vehicle 202). The computing device 100*c* may continually determine braking information for the duration of the drive.

In further arrangements, the computing device 100*c* may determine environmental information based on the telematics data. For example, the computing device 100*c* may determine time-of-day information for the drive, weather information, and the like. The computing device 100*c* may record the time of day during which a drive occurs. For instance, the computing device 100*c* may record which portions of a trip occur after a certain time (e.g., night driving), angle of the sun depending on time of year, geographic location, etc. The computing device 100*c* may, in some examples, continually determine time-of-day information for the duration of the drive. The computing device 100*c* may also record weather information. For example, the computing device 100*c* may determine the weather for the area.

In some embodiments, the computing device 100*c* may determine some information, such as speed limits, time-of-day, or weather information, by recording the time and place of a drive for the driving analysis server to calculate the information (such as the speed limits and weather on a road) based on the time and place of the vehicle 202.

In step 330, the computing device 100*c* may determine that a drive has ended. The computing device 100*c* may notice (for example, by using GPS or accelerometer data) that a vehicle is no longer in motion or that the driver has moved away from the vehicle (based on e.g., the motion of the computing device 100*c*). The computing device 100*c* may then stop recording data for the drive, and/or send a notification of an arrival in step 333.

In step 333, the computing device 100*c* may send an arrival notification in response to the drive or trip ending. For example, when a driver has arrived at a friend's house, the system may generate a notification indicating that the driver has arrived safely. The computing device may use a geofence and a location detection system (such as GPS) to determine that the driver has arrived at a predetermined location. The location may registered as a certain radius around a specific point, such as a school or home. A driver may configure the computing device 100*c* to send an automatic notification, a customized notification (i.e., prompt the driver for input), or not to send a notification at all. The settings may be particular to a given location. For example, a teen driver may choose to automatically notify his mother that he has arrived at school, but may not generate any notification when arriving home (since his mother may be at the home when he gets there).

In step 335, the computing device 100*c* may transmit metric information to a server, such as driving analysis server 205. The computing device 100*c* may compile the driving performance information into driving performance metrics for use by the driving analysis server 205. The computing device 100*c* may then transmit the driving performance metrics to the driving analysis server 205.

In step 340, the driving analysis server 205 may generate a driver performance rating based on the driver performance metric data, such as received environmental and/or telematics data as discussed above, received from the computing device 100*c*. For instance, the driving analysis server 205 may generate a rating out of, for example, one hundred for the drive. For example, the driving analysis server 205 may subtract a first predetermined number of points for every hard braking event, subtract a second predetermined number of points for every fifteen minutes spent night driving, and subtract a third predetermined number of points for every second spent going more than 80 mph. The driving analysis server may then generate a driver performance rating based on the results. For example, if each instance of hard braking and night driving causes a five point reduction, and each occurrence of speeding causes a half point reduction, if a driver had spent thirty seconds speeding, drove only in the day, and had two occurrences of hard braking, the driver may get a score of seventy-five out of one hundred.

In step 345, the driving analysis server 205 may compare the driver performance rating to a driver performance rating threshold. For example, a driver may be required to score at least a predetermined threshold score to have achieved what is considered a "good" rating. In one example, a score of seventy five out of one hundred may be considered a "good" score. If the driver failed to achieve the threshold, such as by achieving a score less than the threshold, the driving analysis server 205 may proceed to reset (e.g., to zero drives or trips having a predetermined threshold score) a rating streak at step 350. If the driver met or exceeded the driver performance rating threshold, such as by scoring at or above the predetermined threshold, then the driver would have achieved the driving score, and a rating streak may be extended in step 355 (e.g., a number of consecutive trips or drives above a predetermined threshold rating may be increased).

In some examples, a driver may extend a rating streak until it reaches a rating streak threshold in order to advance in a competitive, game-like driving program. The game-like driving program may include driving levels, with each level including a rating streak threshold. The rating streak threshold may include a predetermined number of consecutive driver ratings or scores above a driver rating threshold. The predetermined number of consecutive driver ratings above the driver rating threshold may be determined based on the driver level of the driver. Upon reaching a rating streak threshold for a particular driving level, the driver may achieve a reward, such as a cash prize or donation to a charity on their behalf. Additionally or alternatively, upon reaching a rating streak threshold for a particular level, the driver may be promoted to a new level and a rating streak may reset (e.g., consecutive number of driver ratings may return to zero) and a number of consecutive driver ratings above a driver rating threshold may increase in association with being promoted to the next level (e.g., rating streak threshold for higher levels may include more consecutive driver ratings above the driver performance rating threshold than lower levels). For example, a first level (e.g., level 1) may have a rating streak threshold of five driver ratings above a predetermined threshold. Accordingly, a driver may need a streak of five drives rated above the driver performance rating threshold to meet the parameters of level 1 and advance to level 2. In some examples, a second level (e.g., level 2) may have a rating streak threshold of ten consecutive driver ratings above the driver performance rating threshold. Accordingly, a driver may have ten driver ratings above the driver performance rating threshold in order to complete level 2 and advance to level 3. In yet another example, a third level (e.g., level 3) may have a rating streak threshold of fifteen driver ratings above a predetermined threshold. Accordingly, a driver may have fifteen consecutive driver ratings above the predetermined driver performance rating threshold in order to complete level 3 and advance to level 4. Additional levels may also be used without departing from the invention. If a driver does not meet the driver rating threshold, the driver's streak (e.g., number of consecutive drives above the driver rating threshold) may reset to zero, but the driver may maintain his or her level.

In some embodiments, performance may be tracked and/or rewarded in other ways. For example, an incentive for a particular time period may allow anyone who obtains a specified number of very high scores (such as 95 or more out of 100) in that time period to be entered into a sweepstakes. A winner may be chosen at random and awarded a monetary (or otherwise tangible) prize.

In step 350, the driving analysis server 205 may reset the rating streak in response to a driver failing to meet a driver performance rating threshold for a particular drive or trip. For example, a driver who is at level 2 with nine good drives in a row and scores a seventy may have their streak reset to zero, stay at level 2, and therefore may have to restart the effort to meet the predetermined number of driver rating thresholds met to complete level 2 and advance to level 3. The method may subsequently terminate.

In step 355, the driving analysis server 205 may increment (e.g., increase by a count of, for example, one) the number of consecutive driver ratings above the predetermined threshold in the rating streak in response to the driver meeting a driver performance rating threshold. For example, a driver who is at level 2 with nine good drives in a row and scores an eighty may have their streak increased to 10.

In step 360, the driving analysis server 205 may check the current number of driver ratings above the predetermined threshold in the rating streak against a rating streak threshold. If the rating streak threshold has been met (e.g., the predetermined number of consecutive driver ratings above the predetermined threshold has been met), the driver's level may increase. For example, if the driver currently at level 2 has reached their $10^{th}$ good drive in a row (e.g., tenth consecutive driver rating above the predetermined driver rating threshold), which is the rating streak threshold for that level, the driving analysis server 205 may promote the driver to level 3 in step 365. If the driver has failed to reach the threshold, the method may terminate.

In step 365, the driving analysis server 205 may advance the level of the driver in response to the driver meeting the rating streak threshold. For instance, the driving analysis server 205 may increase the level of the driver, reset the rating streak to zero, and increase the rating streak threshold according to the increased level. The driver may then be provided with a reward in step 370.

In step 370, the driving analysis server 205 may provide the driver with a level reward. In some instances, the driving analysis server 205 may send a notification to the computing device 100*c* indicating that the driver has obtained a new level. The driving analysis server 205 may also send a notification to a friend's computer device 100*p* indicating that the driver has reached a higher level.

In some embodiments, the driver may be given a financial reward for reaching a higher level. In some instances, the driver may be rewarded by a charitable donation being made to a predetermined or desired charity. A charitable donation may be a financial contribution of funds to a charity of the organization or the driver's choosing. For example, a sponsor (such as an insurance provider or other corporation) may pledge to give fifty dollars to a charity for every driver who reaches level five in a predetermined period of time, such as within a month, with a maximum pledge of ten thousand dollars for the month. At the end of the month the sponsor may donate the money raised to the charity of their choosing, and/or allow the drivers to select and/or vote on a charity to receive the funds. In some instances, if the driver has not selected a charity, the system may store the donations and allow the driver to select a destination charity at a later time. These financial rewards may have the advantage of incentivizing teen drivers to use the program, using the "carrot" of a reward rather than the "stick" of a mandated or parent-monitored program.

Figure 4:
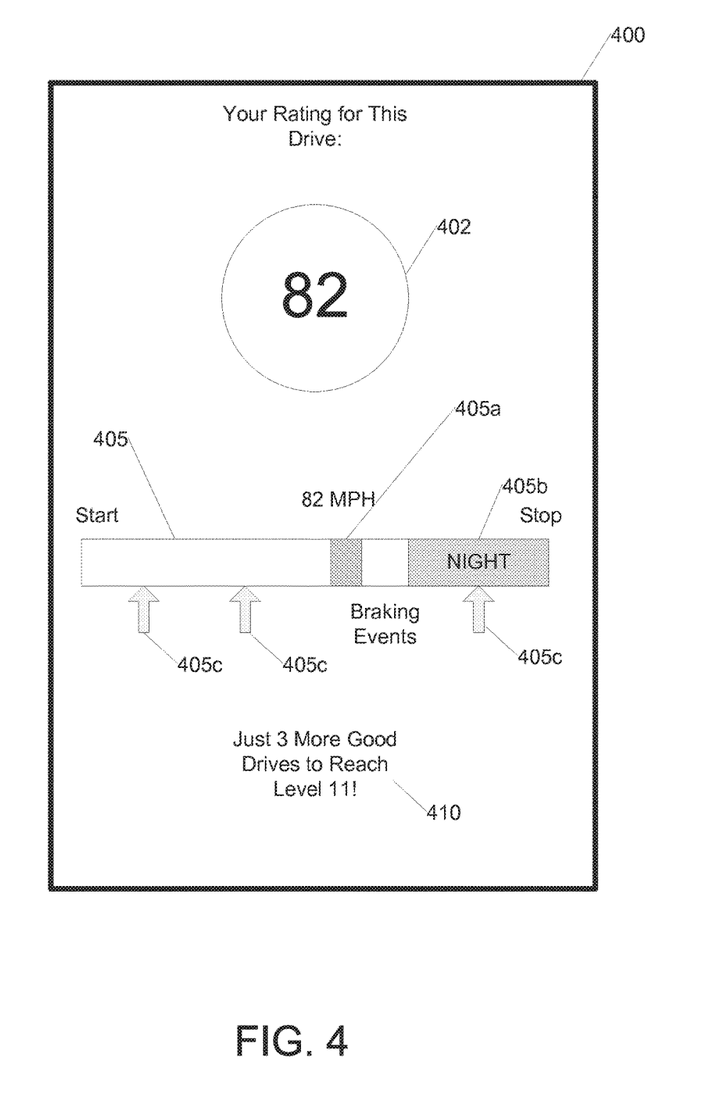
FIG. 4 illustrates an example user interface displaying an example rating screen in accordance with one or more aspects described herein.
Figure 5:
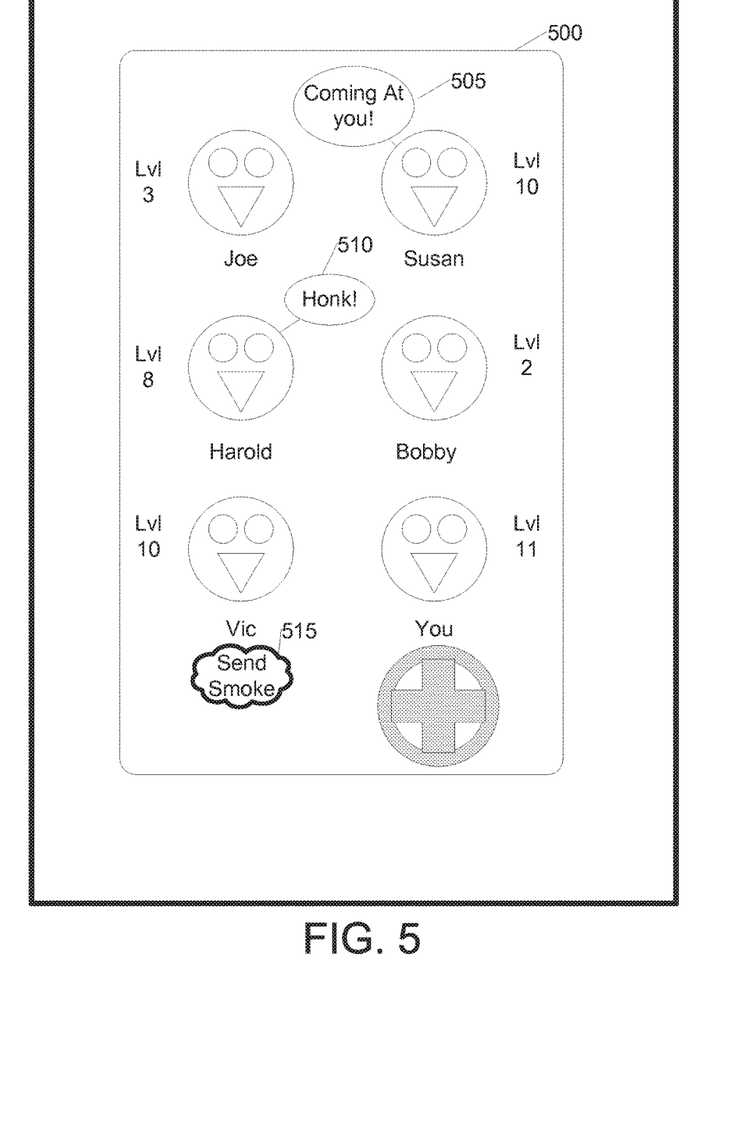
FIG. 5 illustrates an example social user interface in accordance with one or more aspects described herein.
Figure 6:
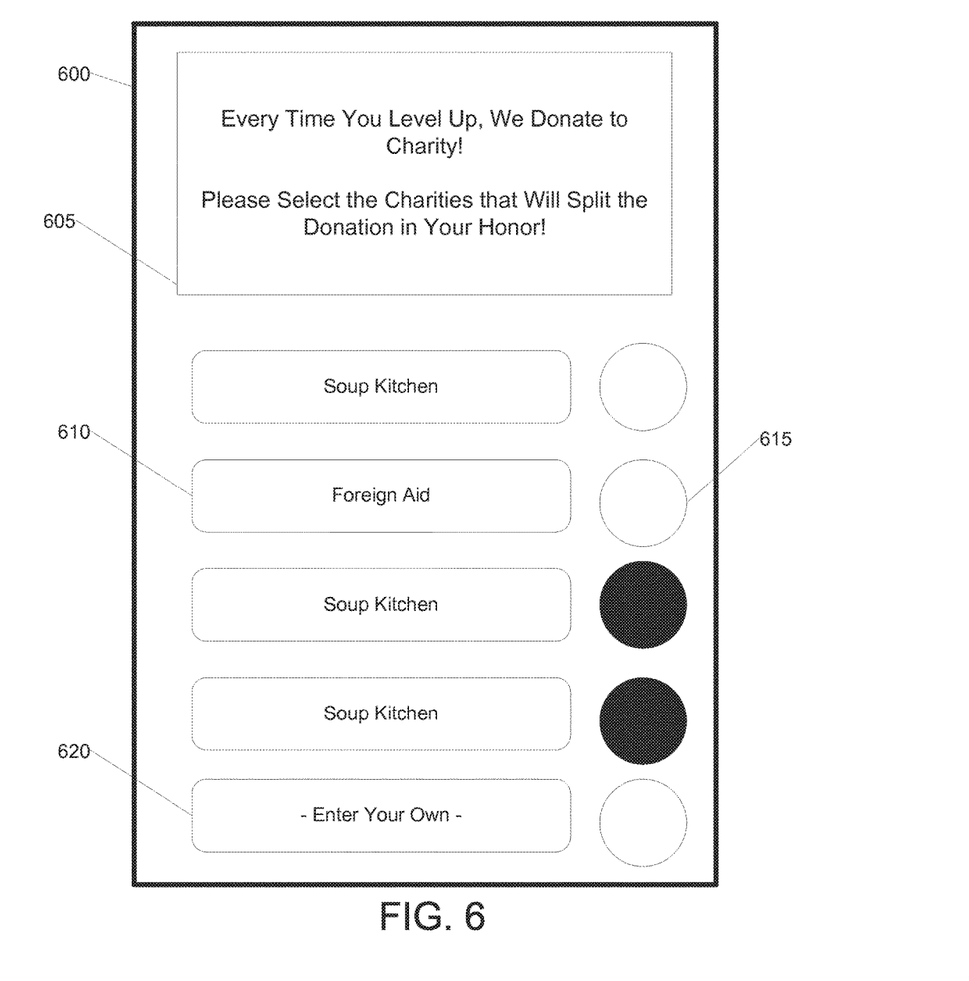
FIG. 6 illustrates an example donation interface in accordance with further aspects described herein.

FIGS. 4-6 illustrate various user interfaces generated by the vehicle telematics management system in accordance with various aspects of this disclosure. In some examples, these user interfaces may be generated by a driver computing device 100*c*. It should be understood that the user interfaces of FIGS. 4-6 are designed to illustrate various features and aspects of the user interfaces and the system, and do not limit the visual appearance or layout of the user interfaces.

FIG. 4 illustrates a user interface 400 displaying an example rating screen for an example driver device program on a screen of a driver computing device 100c. The driver computing device 100c may be a smartphone, and the user interface 400 may be part of a smartphone app. The shortcut may be presented on a home screen (or desktop screen) of an operating system executed by the driver computing device 100c.

FIG. 4 further illustrates displaying ratings to a driver. A rating 402 may inform the driver of his rating for his most recent drive. A rating bar 405 may inform the driver of events that impacted the rating 402. For instance, a speeding period 405a may indicate the duration of a speeding event, and may note the speed traveled. A night-time driving period 405b may indicate a portion of the drive conducted after a specified time period (e.g., night driving). A hard braking event indicator 405c may indicate a period where a hard braking event was recorded. Finally, a progress indicator 410 may indicate progress toward any driver goals, such as a progress for a current rating streak for a new level.

FIG. 5 illustrates an example social interface 500 in accordance with further aspects of the disclosure. The social interface 500 features profiles of various friends that a driver can add to a competitive group. Each profile may represent the levels, streaks, and/or ratings for the driver and/or their friends. For example, the friends and the driver may be featured as a driver and passengers in a car and be a "caravan" of people. In some instances, multiple vehicles may be represented as each holding different drivers. Numerous social features may be represented within the social interface 500. The social interface 500 may display the friends, the driver, and their respective levels. The social interface 500 may display an incoming message 505. The incoming message 505 may be a predefined message, such as a notification that the friend is approaching the driver's level. The social interface 500 may display a quick notification 510. The quick notification 510 may be a quick message (such as "Honk!") that allows friends to say hello without needing a personalized message. The social interface 500 may also allow the driver to send a taunt 515. For example, the driver may send a taunt 515 in the form of smoke, which may display in a friend's caravan. Alternatively, the smoke may cover the friend's screen when he turns on his device or an associated app, and may display a message such as "you have been smoked by John!" In another example, the driver may send a taunt 515 in the form of flashing headlights to another friend, which may indicate that the driver may be about to pass the friend's level. In some instances the taunts may be generated automatically, such as when driver's approach or pass each other's' levels.

In some arrangements, shared driver levels may present a competitive aspect to the system. Drivers may compete to be among the first to achieve a level for a reward. For example, the first five drivers to achieve a predetermined level may achieve a prize. In other instances, social pressures may create a game-like environment. For example, members of a "caravan" (as described above) may compete to see who can be the first to achieve a certain level. In some instances, drivers may challenge each other for rewards. For example, two drivers may wager in-game currency, and the first driver to reach a level or the driver with the highest level at the end of the month wins. Such competitive aspects may help encourage participation in the system, which may encourage better driving.

FIG. 6 illustrates an example donation interface 600 in accordance with further aspects of the disclosure. A set of instructions 605 may inform a driver that he or she has been awarded a donation, and may select from a list of charities 610. The driver may have the option 620 to enter in a charity of their choosing. The user then may select one or more charities from a list, such as by checking bubbles 615. In some arrangements, the system may present a list of options for the driver to choose only one. In further arrangements, a list may be presented, and a driver may vote on which charity will receive a cumulative donation from multiple drivers. Additionally or alternatively, an interface may have an option to have any contributions made to a default charity (e.g., one chosen by the entity making the contribution, such as the insurance provider).

In light of the user interfaces of FIGS. 4-6, it should be understood that other user interfaces may be generated and displayed on the driver computing device. Additionally, it should also be understood that related user interfaces may be generated and displayed on a friend's computing device 100p executing an instance of the system.

Aspects of the invention have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

What is claimed:

1. A driving analysis system comprising a first vehicle on-board data recording system and a driving analysis server:
    wherein the first vehicle on-board data recording system comprises:
        one or more vehicle operation sensors configured to record vehicle operation data at a first vehicle associated with a driver; and
        one or more telematics devices configured to transmit the recorded vehicle operation data from the first vehicle to the driving analysis server,
    wherein the driving analysis server comprises a processor and a memory unit storing computer-executable instructions, which when executed by the processor, cause the driving analysis server to:
        receive the vehicle operation data from the first vehicle on-board data recording system for a driving trip;
        determine, based on the received vehicle operation data and for a predetermined period of a travel of the first vehicle during the driving trip, a base driver performance rating;
        determine a driving score reduction based on the received vehicle operation data and for the predetermined period of the travel, wherein the vehicle operation data comprises one or more of a number of hard braking events, a number of speeding instances, or a length of time traveled at night;
        determine, based on the base driver performance rating and the driving score reduction, at least one driver performance rating;
        compare the at least one driver performance rating against one or more predetermined driver performance rating thresholds; and
        select one of a plurality of driver levels based on the comparison.

2. The driving analysis system of claim 1, wherein the vehicle operation data comprises the number of hard braking events, the number of speeding instances, and the length of time traveled at night.

3. The driving analysis system of claim 2, wherein the number of hard braking events is assigned a first weight, wherein the number of speeding instances is assigned a second weight, wherein the length of time traveled is assigned a third weight;
   wherein the first weight, the second weight, and the third weight are different; and
   wherein the determining the driving score reduction is based on the first weight, the second weight, and the third weight.

4. The driving analysis system of claim 1, wherein the one or more vehicle operation sensors comprise a global positioning system (GPS) and an accelerometer, and wherein the one or more telematics devices comprise a mobile phone.

5. The driving analysis system of claim 1, wherein the determining the at least one driver performance rating comprises subtracting the driving score reduction from the base driver performance rating.

6. The driving analysis system of claim 1, wherein the driving analysis server further comprises computer-executable instructions, which when executed by the processor, cause the driving analysis server to transmit a notification comprising an indication of the one of the plurality of driver levels and a name associated with the driver.

7. The driving analysis system of claim 1, wherein the driving analysis server further comprises computer-executable instructions, which when executed by the processor, cause the driving analysis server to:
   receive a request to add a profile to a list of profiles associated with the driver and a competing driver;
   compile a list of driver levels associated with the profile and the list of profiles; and
   transmit the list of driver levels for output to a display.

8. A driving analysis system comprising a mobile device and a driving analysis server,
   wherein the mobile device comprises one or more vehicle operation sensors configured to record vehicle operation data at a first vehicle and to transmit the vehicle operation data from the first vehicle to the driving analysis server,
   wherein the vehicle operation data comprises speed information and braking information associated with the first vehicle associated with a driver, and
   wherein the driving analysis server comprises a processor and a memory unit storing computer-executable instructions, which when executed by the processor, cause the driving analysis server to:
      receive the vehicle operation data from the mobile device;
      determine, based on the received vehicle operation data and for a predetermined period of a travel, a base driver performance rating;
      determine a driving score reduction based on the received vehicle operation data and for the predetermined period of the travel, wherein the vehicle operation data comprises one or more of a number of hard braking events, a number of speeding instances, or a length of time traveled at night;
      determine, based on the base driver performance rating and the driving score reduction, at least one driver performance rating;
      compare the at least one driver performance rating against one or more predetermined driver performance rating thresholds; and
      select one of a plurality of driver levels based on the comparison.

9. The driving analysis system of claim 8, wherein the vehicle operation data comprises the number of hard braking events, the number of speeding instances, and the length of time traveled at night.

10. The driving analysis system of claim 9, wherein the number of hard braking events is assigned a first weight, wherein the number of speeding instances is assigned a second weight, wherein the length of time traveled is assigned a third weight;
    wherein the first weight, the second weight, and the third weight are different; and
    wherein the determining the driving score reduction is based on the first weight, the second weight, and the third weight.

11. The driving analysis system of claim 8, wherein the one or more vehicle operation sensors comprise a global positioning system (GPS) and an accelerometer.

12. The driving analysis system of claim 8, wherein the determining the at least one driver performance rating comprises subtracting the driving score reduction from the base driver performance rating.

13. The driving analysis system of claim 8, wherein the driving analysis server further comprises computer-executable instructions, which when executed by the processor, cause the driving analysis server to transmit a notification comprising an indication of the one of the plurality of driver levels and a name associated with the driver.

14. The driving analysis system of claim 8, wherein the driving analysis server further comprises computer-executable instructions, which when executed by the processor, cause the driving analysis server to:
    receive a request to add a profile to a list of profiles associated with the driver and a competing driver;
    compile a list of driver levels associated with the profile and the list of profiles; and
    transmit the list of driver levels for output to a display.

15. An apparatus comprising:
    one or more vehicle operation sensors configured to record vehicle operation data at a first vehicle associated with a driver; and
    one or more telematics devices configured to transmit the recorded vehicle operation data from the first vehicle to a processor,
    the processor and a memory unit storing computer-executable instructions, which when executed by the processor, cause the processor to:
       receive the vehicle operation data;
       determine, based on the received vehicle operation data, a base driver performance rating;
       determine a driving score reduction based on the received vehicle operation data, wherein the vehicle operation data comprises one or more of a number of hard braking events, a number of speeding instances, or a length of time traveled at night;
       determine, based on the base driver performance rating and the driving score reduction, at least one driver performance rating;
       compare the at least one driver performance rating against one or more predetermined driver performance rating thresholds; and
       select one of a plurality of driver levels based on the comparison.

16. The apparatus of claim 15, wherein the vehicle operation data comprises the number of hard braking events, the number of speeding instances, and the length of time traveled at night.

17. The apparatus of claim 16, wherein the number of hard braking events is assigned a first weight, wherein the number of speeding instances is assigned a second weight, wherein the length of time traveled is assigned a third weight;
  wherein the first weight, the second weight, and the third weight are different; and
  wherein the determining the driving score reduction is based on the first weight, the second weight, and the third weight.

18. The apparatus of claim 15, wherein the one or more vehicle operation sensors comprise a global positioning system (GPS) and an accelerometer, and wherein the one or more telematics devices comprise a mobile phone.

19. The apparatus of claim 15, wherein the apparatus further comprises computer-executable instructions, which when executed by the processor, cause the processor to transmit a notification indicating the one of the plurality of driver levels and a name associated with the driver.

20. The apparatus of claim 15, wherein the apparatus further comprises computer-executable instructions, which when executed by the processor, cause the processor to:
  receive a request to add a profile to a list of profiles associated with the driver and a competing driver;
  compile a list of driver levels associated with the profile and the list of profiles; and
  transmit the list of driver levels for output to a display.

\* \* \* \* \*